United States Patent Office 3,047,571
Patented July 31, 1962

3,047,571
DERIVATIVES OF OXOPIPERIDINYL
PHENTHIAZINES
Robert Michel Jacob, Ablon-sur-Seine, and Jacques Georges Robert, Gentilly, France, assignors to Societe des Usines Chimiques Rhone-Poulenc, Paris, France, a French body corporate
No Drawing. Filed May 2, 1960, Ser. No. 25,864
Claims priority, application Great Britain May 8, 1959
8 Claims. (Cl. 260—243)

This invention relates to new derivatives of phenthiazine, to processes for their preparation, and pharmaceutical compositions containing them.

During especially the past decade, considerable research and experimentation have been conducted in the field of N-substituted phenthiazine derivatives and certain of these compounds have been found to possess valuable therapeutic properties. Some are useful primarily on account of outstanding antihistaminic activity, others because of their unusually powerful effect as potentiators of drugs which act upon the nervous system and of their efficacy as anti-shock agents and yet others are, for example, effective agents for controlling or minimising motion-sickness. It has nevertheless been demonstrated that of the very large number of possible N-substituted phenthiazine compounds that have been proposed or tested by various workers, only comparatively few types have useful application in human or veterinary medicine and that both the nature and the degree of useful effect can radically alter even with apparently small changes in chemical structure.

It is an object of the present invention to provide new phenthiazine derivatives which possess useful pharmacological properties of a nature (hereinafter referred to in detail) and of a degree of activity that could not have been predicted from knowledge of their chemical structure.

The phenthiazine derivatives of the present invention are those which conform to the general formula:

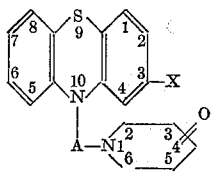

I (wherein A represents a saturated, straight or branched chain aliphatic hydrocarbon group containing from 2 to 4 carbon atoms with at least two carbon atoms between the nitrogen atoms of the piperidine and phenthiazine nuclei, X represents a hydrogen or halogen atom or a lower alkyl, lower alkoxy, lower acyl, cyano, methylthio, methanesulphonyl, dimethylsulphamoyl or trifluoromethyl group, the oxygen atom is attached to the carbon atom occupying the 3-, 4- or 5-position of the piperidine nucleus and each of the other carbon atoms of the piperidine nucleus may carry one or two lower alkyl groups) and their ketals and acid addition and quaternary ammonium salts. By the word "lower" as applied herein to alkyl, alkoxy and acyl groups is to be understood radicals containing not more than four carbon atoms.

These new phenthiazine compounds may be prepared by the application of known methods for the conversion of phenthiazine and its C-substituted products into the corresponding 10-aminoalkyl-phenthiazines. Such methods when so applied can be defined generically as comprising the interaction of a phenthiazine derivative of the formula:

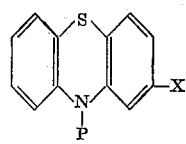

II (wherein X is as hereinbefore defined) with a compound Q, the group P and the compound Q being such that they will interact to produce or form in the 10-position of the phenthiazine nucleus a grouping of the formula:

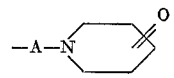

III (wherein A is as hereinbefore defined and the oxygen atom is attached to the carbon atom that occupies the 3-, 4- or 5-position of the piperidine nucleus and each of the other carbon atoms of the piperidine nucleus may carry one or two lower alkyl groups).

According to a feature of the present invention, the phenthiazine derivatives of formula I are prepared by reacting a phenthiazine of the general formula:

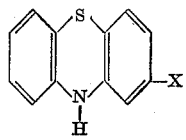

IV (wherein X is as hereinbefore defined) with a piperidine derivative of the general formula:

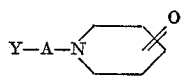

V (wherein the oxygen atom is attached to the carbon atom that occupies the 3-, 4- or 5-position of the piperidine nucleus, the >C=O group preferably being protected by the formation of, for example, a ketal group, and each of the other carbon atoms of the piperidine nucleus may carry one or two lower alkyl groups, Y represents the acid residue of a reactive ester, such as a halogen atom or a sulphuric or sulphonic ester residue, and A is as hereinbefore defined). When X is an acyl group it may be advantageous to protect this group during the reaction, for example, by forming an anil or ketal.

The reaction may be effected with or without a solvent in the presence or absence of a condensing agent. It is advantageous to use a solvent of the group of aromatic hydrocarbons (for example, toluene or xylene), ethers (for example, diethyl ether) or tertiary amides (for example, dimethylformamide) in the presence of a condensing agent, preferably of the class of alkali metals and their derivatives (such as, for example, hydrides, amides, hydroxides, alkoxides or metal alkyls or aryls) and, more particularly, metallic sodium or potassium, sodamide, powdered sodium or potassium hydroxide, lithium or sodium hydride, sodium tert.-butylate, butyllithium, phenyllithium and phenyl-sodium. The reaction is preferably carried out at the boiling temperature of the solvent.

In the case where the divalent aliphatic hydrocarbon group —A— is an asymmetric branched chain such, for example, as

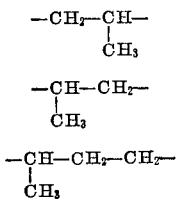

or

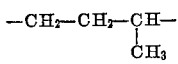

isomerisation can take place during the course of the reaction with the formation of a mixture of isomers. This isomerisation is analogous to that which takes place in the preparation of promethazine by the condensation of phenthiazine with a dimethylaminohalogenopropane, a process which, using either 2-dimethylamino-1-chloropropane or 1-dimethylamino-2-chloropropane as starting material, gives the same final mixture in which promethazine predominates. Separation of the isomers may be effected by, for example, fractional crystallisation of salts such as the hydrochlorides from a suitable solvent such as alcohol.

According to a further feature of the present invention, the phenthiazine derivatives of general formula I are prepared by reacting a phenthiazine compound of the general formula:

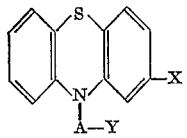

(wherein A, X and Y are as hereinbefore defined) with a piperidine derivative of the formula:

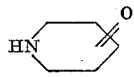

(wherein the oxygen atom is attached to the carbon atom that occupies the 3-, 4- or 5-position of the piperidine nucleus, the >C=O group preferably being protected, and each of the other carbon atoms of the piperidine nucleus may carry one or two lower alkyl groups).

The reaction is effected by heating the reactants to a temperature between 50 and 150° C., preferably in an inert organic solvent such as an alcohol or an aromatic hydrocarbon, for example benzene or xylene, and optionally in the presence of a condensing agent which acts as an acid-binding agent, such as an alkali metal carbonate. As condensing agent, there may also be used an excess of the piperidine derivative.

According to another feature of the present invention, the phenthiazine derivatives of general Formula I are prepared by decarboxylation of a phenthiazine-10-carboxylate of the general formula:

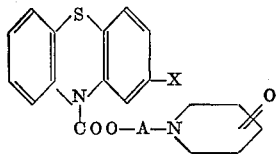

(wherein the oxygen atom is attached to the carbon atom that occupies the 3-, 4- or 5-position of the piperidine nucleus, the >C=O group preferably being protected, and each of the other carbon atoms of the piperidine nucleus may carry one or two lower alkyl groups, and A and X are as hereinbefore defined) by heating to a temperature above 100° C., preferably between 150 and 250° C., until evolution of carbon dioxide ceases.

There is no advantage in operating at temperatures higher than 250° C. since the reaction products are then generally more discoloured. The reaction can be effected with the phenthiazine-10-carboxylate alone, i.e. without a diluent, or in an inert organic solvent of high boiling point such as diphenyl, diphenyl oxide, quinoline, weak bases or o-dichlorobenzene.

During the course of the decomposition of the phenthiazine-10-carboxylate an isomerisation, similar to that described with respect to the first process, takes place when the divalent aliphatic group A is an asymmetric branched chain.

The phenthiazine-10-carboxylates of Formula VIII may be obtained by known methods, for example, by the action of a phenthiazinyl-10-carboxylic acid halide upon an alcohol of the general formula:

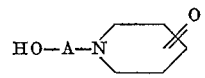

(wherein A is as hereinbefore defined and the oxygen atom is attached to the carbon atom that occupies the 3-, 4- or 5-position of the piperidine nucleus and each of the other carbon atoms may carry one or two lower alkyl groups).

In the aforementioned processes, when the ketonic group in the piperidine nucleus is protected by the formation of a ketal, the products obtained are within the scope of the invention. A protected ketonic group may be, or is when the ketonic grouping is protected by the formation of a group other than a ketal, liberated at the end of the reaction in manner known per se according to the nature of the protecting groups, e.g. by acid hydrolysis when the group is protected by the formation of a ketal.

The new phenthiazine derivatives of the present invention and their ketals, and acid addition and quaternary ammonium salts thereof, possess pharmacological properties; in particular, they are highly active analgesics and decontracturants i.e. muscle relaxants. Of outstanding importance are those compounds in which the hydrocarbon chain A is —(CH$_2$)$_3$— or

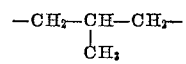

in particular 3-chloro - 10 - (3-4'-oxo-piperidinopropyl)-phenthiazine, 3 - cyano - 10 - (3-4'-oxo-piperidinopropyl)-phenthiazine, 3 - methoxy-10-(3-4'-oxo-piperidino-2-methylpropyl)phenthiazine, 3 - methylthio-10-(3-4'-oxo-piperidinopropyl)phenthiazine, 3-methylthio - 10 - (3-4'-oxo-piperidino - 2 - methylpropyl)phenthiazine, 3 - dimethylsulphamoyl-10-(3 - 4' - oxo-piperidino-2-methylpropyl)phenthiazine and 3-methanesulphonyl-10-(3-4'-oxo-piperidino-2-methylpropyl)phenthiazine.

For therapeutic purposes, the bases of general Formula I are preferably employed as such or in the form of non-toxic acid addition salts, i.e. salts containing anions which are relatively innocuous to the animal organism in therapeutic doses of the salts (such as hydrochlorides and other hydrohalides, phosphates, nitrates, sulphates, acetates, propionates, succinates, benzoates, fumarates, maleates, citrates, tartrates, methanesulphonates, ethanedisulphonates, and 8-chlorotheophyllinates) so that the beneficial physiological properties inherent in the bases are not vitiated by side-effects ascribable to the anions. However, they may also be employed in the form of non-toxic quaternary ammonium salts obtained by reaction with organic halides (e.g. methyl, ethyl, allyl or benzyl iodide, chloride or bromide) or other reactive esters, e.g. methyl or ethyl sulphate or toluene-p-sulphonate, or by other known methods for the production of quaternary ammonium salts.

The following examples illustrate the invention:

*Example 1*

A solution of 3-chloro-10-(3-chloropropyl)phenthiazine (13.7 g.) and 4,4-diethoxypiperidine (8.4 g.) in anhydrous ethanol (85 cc.) is heated under reflux for 21 hours in the presence of powdered anhydrous sodium carbonate (4.7 g.). A further quantity (2.3 g.) of sodium carbonate is then added and heating is continued for 8 hours. After a final addition of sodium carbonate (2.3 g.), the reaction is completed by heating for 16 hours under reflux.

The ethanol is removed under reduced pressure (about 20 mm. Hg). The residue is treated with distilled water (30 cc.) and extracted with ethyl acetate (200 cc.). The organic phase is dried over anhydrous potassium carbonate and concentrated to dryness under reduced pressure (about 20 mm. Hg). After recrystallisation of the solid residue from petroleum ether (B.P. range 70–120° C.), there is obtained 3-chloro-10-(3-4',4'-diethoxypiperidinopropyl)phenthiazine (13.5 g.) as a creamy white crystalline powder, M.P. 84–86° C.

A solution of 3-chloro-10-(3-4',4'-diethoxypiperidinopropyl)phenthiazine (9.17 g.) in N hydrochloric acid (410 cc.) is heated for 2 hours under reflux. Solvent (100 cc.) is removed under atmospheric pressure and, after cooling and making alkaline with sodium hydroxide ($d=1.33$, 60 cc.), the free base is extracted with ethyl acetate and the organic solution is dried over anhydrous potassium carbonate and concentrated to dryness under reduced pressure (about 20 mm. Hg). The oily residue (7.5 g.) is converted into an acid oxalate in acetone and there is thus obtained the acid oxalate of 3-chloro-10-(3-4'-oxo-piperidinopropyl)phenthiazine (8 g.) as a white crystalline powder, M.P. 200–203° C.

The required 4,4-diethoxypiperidine (B.P. 101–102° C./20 mm. Hg) is prepared by the debenzylation of 1-benzyl-4,4-diethoxypiperidine in methanol in the presence of palladised charcoal at 100° C. under a hydrogen pressure of 100 kg./cm.$^2$ in 89% yield. 1-benzyl-4,4-diethoxypiperidine (B.P. 134–147° C./0.75 mm. Hg) is obtained by forming the acetal of 1-benzyl-4-piperidone in ethanol with ethyl orthoformate in the presence of dry hydrogen chloride in 95% yield.

*Example II*

Proceeding as in Example I but commencing with 3-cyano-10-(3-chloropropyl)phenthiazine (8.5 g.), 4,4-diethoxypiperidine (5.4 g.), ethanol (70 cc.) and anhydrous sodium carbonate (total 6 g.), the ethanol is removed under reduced pressure (about 20 mm. Hg) and the residue is treated with distilled water (100 cc.) and extracted with ethyl acetate (400 cc.). The organic phase is dried over anhydrous potassium carbonate and concentrated to dryness under reduced pressure (about 20 mm. Hg). There is thus obtained crude 3-cyano-10-(3-4',4'-diethoxypiperidinopropyl)phenthiazine (12 g.) which is dissolved in N hydrochloric acid (550 cc.) and heated under reflux for 2 hours.

Solvent (300 cc.) is removed under reduced pressure (about 20 mm. Hg) and, after cooling, the acid liquors are extracted with ethyl acetate (300 cc.). The liquors are then made alkaline with sodium hydroxide ($d=1.33$) and the free base is extracted with ethyl acetate. The organic solution is dried over anhydrous potassium carbonate and concentrated to dryness. On recrystallisation of the solid residue from ethanol there is obtained 3-cyano-10-(3-4'-oxo-piperidinopropyl)phenthiazine (3.7 g.) as a yellow crystalline powder, M.P. 98–100° C.

*Example III*

Proceeding as in Example II but commencing with 3-methoxy-10-(3-chloro-2-methylpropyl)phenthiazine (19.2 g.) 4,4-diethoxypiperidine (11.4 g.), ethanol (140 cc.) and anhydrous sodium carbonate (total 14 g.), there is obtained 3-methoxy-10-(3-4',4'-diethoxypiperidino-2-methylpropyl)phenthiazine, which is isolated in crude state, and hydrolysed with N hydrochloric acid by heating for 3 hours under reflux. After the usual treatment there is isolated 3-methoxy-10-(3-4'-oxo-piperidino-2-methylpropyl)phenthiazine (4.5 g.) which, after purification by recrystallisation from ethyl acetate, is obtained as a creamy white crystalline powder, M.P. 134–136° C.

*Example IV*

A solution of 3-methylthio-10-(3-methanesulphonyloxypropyl)phenthiazine (25.1 g.) and 4,4-diethoxypiperidine (23 g.) in anhydrous toluene (100 cc.) is heated under reflux for 24 hours. After cooling, the toluene phase is separated from the thick brown oil which is formed during the heating. The oil is triturated with benzene (100 cc.) and the benzene solution combined with the preceding toluene phase.

The organic solution is extracted with about 0.3 N aqueous hydrochloric acid (80 cc.), the aqueous solution obtained washed with ether (100 cc.), made alkaline with sodium hydroxide solution ($d=1.33$; 9 cc.) and the free base extracted with chloroform (2 x 100 cc.). The chloroformic solution is dried over potassium carbonate and concentrated to dryness under reduced pressure (about 20 mm. Hg).

Crude 3-methylthio-10-(3-4',4'-diethoxypiperidinopropyl)phenthiazine (14.5 g.) is thus obtained which is heated under reflux for 1 hour with 0.5 N hydrochloric acid (150 cc.). After cooling, the solution is made alkaline with sodium hydroxide solution ($d=1.33$, 10 cc.) and the free base extracted with ethyl acetate. The solution is dried over anhydrous potassium carbonate and concentrated to dryness under reduced pressure (about 20 mm. Hg). The oily residue (12 g.) is dissolved in anhydrous benzene (200 cc.), the solution filtered through a column of chromatographic alumina (100 g.) and eluted with benzene. After removal of solvent, the isolated pure base is converted into the acid oxalate in acetone giving 3-methylthio-10-(3-4'-oxo-piperidinopropyl)-phenthiazine acid oxalate as a cream-white crystalline powder, M.P. 112–115° C.

*Example V*

Proceeding as in Example IV but commencing with 3-methylthio-10-(3-methanesulphonyloxy-2-methylpropyl)phenthiazine (30.8 g.) and 4,4-diethoxypiperidine (27.6 g.) in anhydrous toluene (100 cc.), there is obtained crude 3-methylthio-10-(3-4',4'-diethoxypiperidino-2-methylpropyl)phenthiazine (23.7 g.) which is heated under reflux for 1 hour with 0.5 N hydrochloric acid (240 cc.). After cooling and making alkaline with sodium hydroxide solution ($d=1.33$, 20 cc.), the free base is extracted with ethyl acetate. The solution obtained is dried over potassium carbonate and concentrated to dryness under reduced pressure (about 20 mm. Hg). The oily residue (19 g.) is dissolved in anhydrous benzene (250 cc.), the solution filtered through a column of chromatographic alumina (100 g.) and eluted with benzene. By evaporation of the solvent and recrystallisation of the residue in ethanol, 3-methylthio-10-(3-4'-oxo-piperidino-2-methylpropyl)phenthiazine is obtained in the form of a cream-white crystalline powder, M.P. 104–105° C.

*Example VI*

Proceeding as in Example IV but commencing with 3-dimethylsulphamoyl-10-(3-methanesulphonyloxy-2-methylpropyl)phenthiazine (45.6 g.) and 4,4-diethoxypiperidine (34.6 g.) in anhydrous toluene (150 cc.), there is obtained crude 3-dimethylsulphamoyl-10-(3-4',4'-diethoxypiperidino-2-methylpropyl)phenthiazine (24 g.) which is heated under reflux for 1 hour with 0.5 N hydrochloricacid (210 cc.). After cooling and making alkaline by the addition of potassium carbonate (15 g.), the free base is exrtacted with chloroform. The organic solution is dried over potassium carbonate and concentrated to dryness under reduced pressure (about 20 mm. Hg).

The oily residue (19.3 g.) is dissolved in anhydrous benzene (250 cc.), filtered through a column of "Woelm" neutral alumina (No. 1 quality, 100 g.) and eluted with benzene. After evaporation of the solvent and two successive recrystallisations of the residue in ethanol, 3-dimethylsulphamoyl - 10 - (3 - 4'-oxo-piperidino-2-methylpropyl)phenthiazine is obtained as a cream-white crystalline powder, M.P. 134–136° C.

*Example VII*

Proceeding as in Example IV but commencing with 3 - methanesulphonyl - 10 - (3-methanesulphonyloxy-2-methylpropyl)phenthiazine (17.7 g.) and 4,4-diethoxypiperidine (14.7 g.) in toluene (100 cc.), there is obtained crude 3 - methanesulphonyl - 10 - (3-4',4'-diethoxypiperidino-2-methylpropyl)phenthiazine (19.1 g.) which is heated under reflux for 1 hour with 0.5 N hydrochloric acid (180 cc.). After cooling and making alkaline with sodium hydroxide solution ($d$=1.33, 25 cc.), the free base is extracted with chloroform, the organic solution dried over potassium carbonate and concentrated to dryness under reduced pressure (about 20 mm. Hg). The oily residue (14.2 g.) is dissolved in anhydrous benzene (200 cc.) and the solution filtered through a column of "Woelm" neutral alumina (No. 1 quality, 100 g.) and eluted with benzene. After evaporation of solvent and recrystallisation first in acetonitrile and then in ethyl acetate, 3 - methanesulphonyl - 10-(3-4'-oxo-piperidino-2-methylpropyl)phenthiazine in the form of a cream-white crystalline powder, M.P. 168–170° C., is obtained.

The present invention further includes within its scope pharmaceutical compositions which comprise one or more compounds of general Formula I or their ketals or acid addition or quaternary ammonium salts together with a significant amount of a pharmaceutical carrier. In clinical practice the compounds of the present invention will normally be administered orally, in consequence of which the preferred formulations are those made up for oral administration.

Solid compositions for oral administration include compressed tablets, pills, dispersible powders, and granules. In such solid compositions one or more of the active compounds is, or are, admixed with at least one inert diluent such as calcium carbonate, potato starch, alginic acid, or lactose. The compositions may also comprise, as is normal practice, additional substances other than inert diluents, e.g. lubricating agents, such as magnesium stearate. Liquid compositions for oral administration include pharmaceutically acceptable emulsions, solutions, suspensions, syrups and elixirs containing inert diluents commonly used in the art, such as water and liquid paraffin. Besides inert diluents such compositions may also comprise adjuvants, such as wetting and suspending agents, and sweetening, flavouring and preserving agents. The compositions according to the invention, for oral administration, also include capsules of absorbable material such as gelatin containing one or more of the active substances with or without the addition of diluents or excipients.

Preparations according to the invention for parenteral administration include sterile aqueous or non-aqueous solutions, suspensions, or emulsions. Examples of non-aqueous solvents or suspending media are propylene glycol, polyethylene glycol, vegetable oils such as olive oil, and injectable organic esters such as ethyl oleate. These compositions may also contain adjuvants such as preserving, wetting, emulsifying and dispersing agents. They may be sterilised by, for example, filtration through a bacteria-retaining filter, by incorporation in the compositions of sterilising agents, by irradiation, or by heating. They may also be manufactured in the form of sterile solid compositions, which can be dissolved in sterile water or some other sterile injectable medium immediately before use.

The percentage of active ingredient in the compositions of the invention may be varied, it being necessary that it should constitute a proportion such that a suitable dosage for the therapeutic effect desired shall be obtained. Obviously several unit dosage forms may be administered at about the same time. In general, the preparations should normally contain at least 0.025% by weight of active substance when required for administration by injection; for oral administration the preparations will normally contain at least 0.1% by weight of active substance.

The following examples illustrate pharmaceutical compositions according to the invention.

*Example VIII*

Tablets (150 mg.) are prepared containing:

|  | Mg. |
|---|---|
| 3 - chloro - 10 - (3 - 4' - oxo - piperidinopropyl) phenthiazine | 25.8 |
| Starch | 91.2 |
| Finely powdered silica | 30 |
| Magnesium stearate | 3 |

*Example IX*

Tablets (150 mg.) are prepared containing:

|  | Mg. |
|---|---|
| 3 - methoxy - 10 - (3 - 4' - oxo - piperidino - 2 - methylpropyl) - phenthiazine | 10.6 |
| Starch | 106.4 |
| Powdered silica | 30 |
| Magnesium stearate | 3 |

We claim:

1. A compound selected from the group consisting of phenthiazine derivatives of the formula:

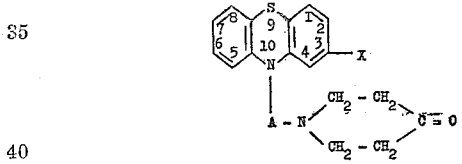

wherein A represents an alkylene group containing from 2 to 4 carbon atoms with at least two carbon atoms between the nitrogen atoms of the piperidine and phenthiazine nuclei, X is selected from the class consisting of hydrogen and halogen atoms and lower alkyl, lower alkoxy, lower acyl, cyano, methylthio, methanesulphonyl, dimethylsulphamoyl and trifluoromethyl groups, and the non-toxic acid addition and quaternary ammonium salts of said phenthiazine derivatives.

2. The compound 3-chloro-10-(3-4'-oxopiperidinopropyl)phenthiazine.

3. The compound 3-cyano-10-(3-4'-oxopiperidinopropyl)phenthiazine.

4. The compound 3-methoxy-10-(3-4'-oxopiperidino-2-methylpropyl)phenthiazine.

5. The compound 3-methylthio-10-(3-4'-oxopiperidinopropyl)phenthiazine.

6. The compound 3-methylthio-10-(3-4'-oxopiperidino-2-methylpropyl)phenthiazine.

7. The compound 3-dimethylsulphamoyl-10-(3-4'-oxopiperidino-2-methylpropyl)phenthiazine.

8. The compound 3-methanesulphonyl-10-(3-4'-oxopiperidino-2-methylpropyl)phenthiazine.

References Cited in the file of this patent

UNITED STATES PATENTS

| 2,787,617 | Cusic et al. | Apr. 2, 1957 |
| 2,928,767 | Gulesich et al. | Mar. 15, 1960 |
| 2,931,810 | Yale et al. | Apr. 5, 1960 |